June 20, 1967     J. B. POPPER     3,326,340
ONE-WAY LOCKING OR BRAKING DEVICE
Filed Aug. 16, 1965     3 Sheets-Sheet 1
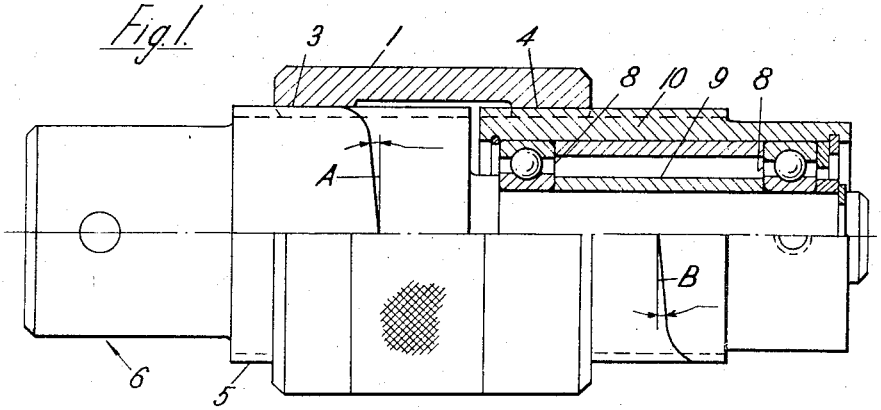
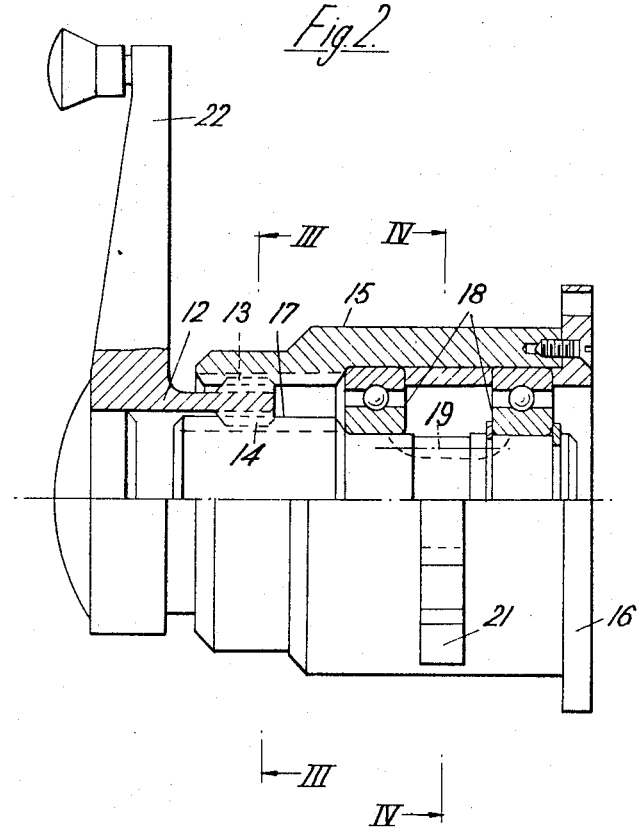

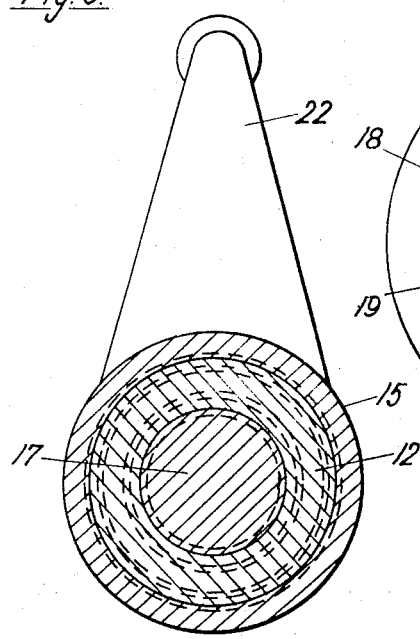
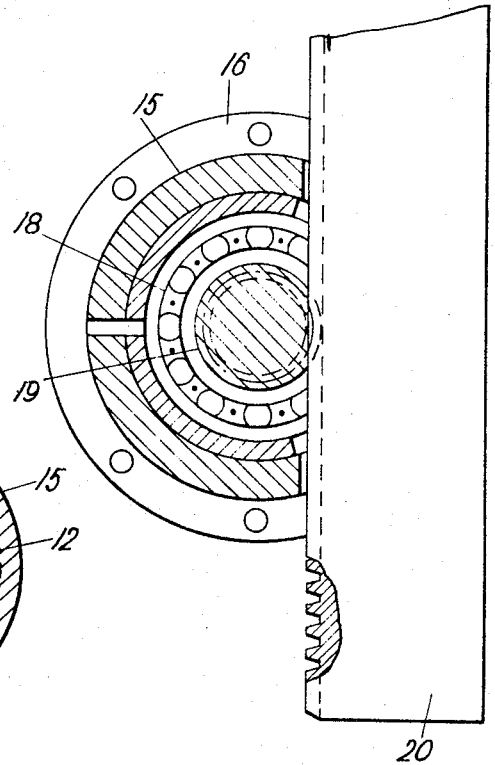
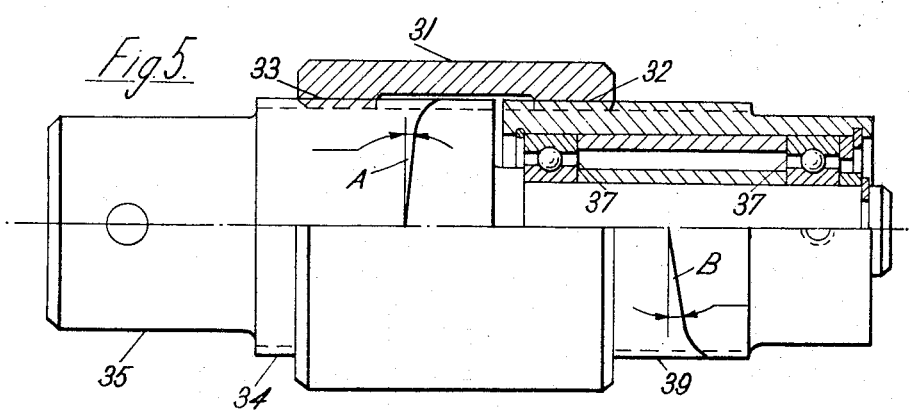

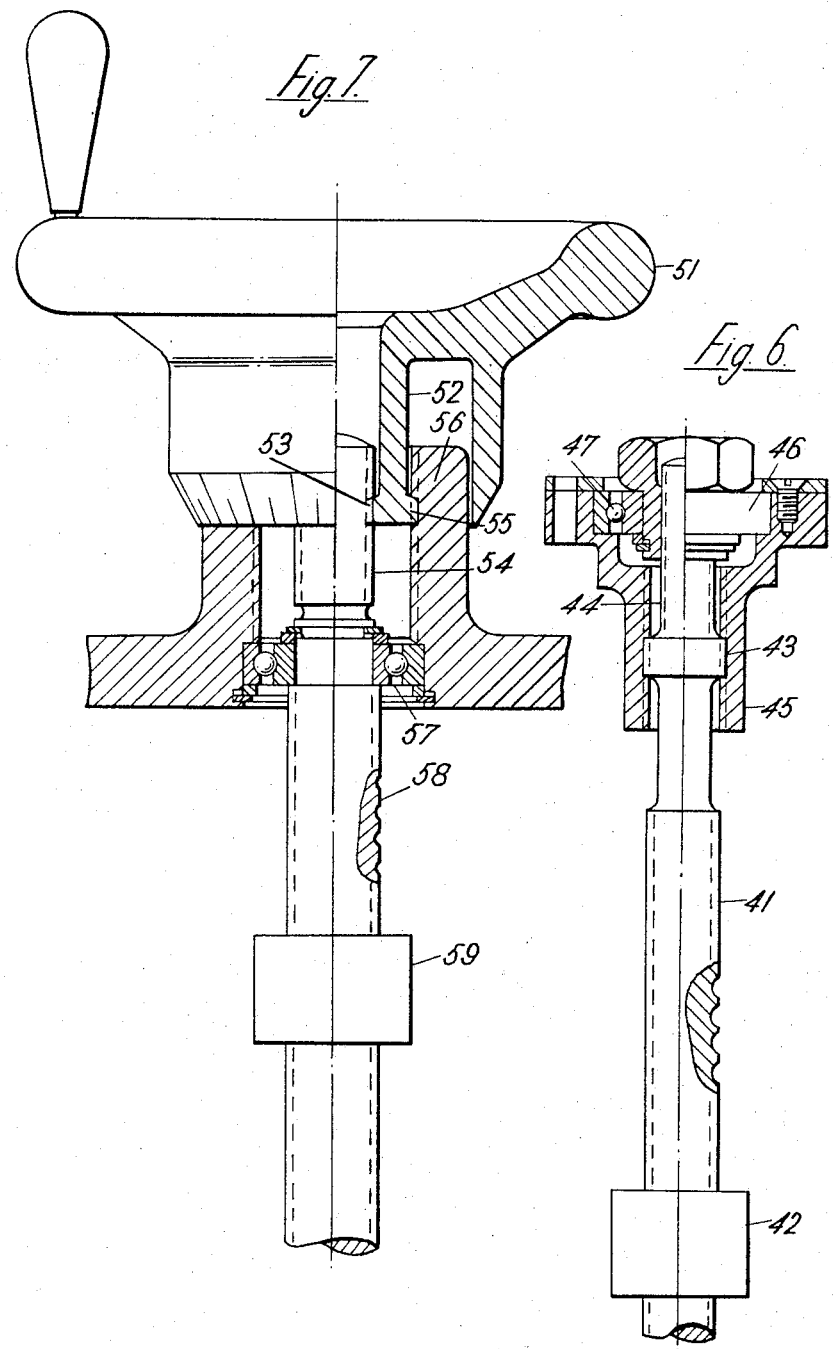

United States Patent Office 3,326,340
Patented June 20, 1967

3,326,340
ONE-WAY LOCKING OR BRAKING DEVICE
Jakhin Boas Popper, 6 Ranas St.,
Kiryat Motzkin, Israel
Filed Aug. 16, 1965, Ser. No. 479,929
Claims priority, application Israel, Aug. 20, 1964,
21,948; Mar. 3, 1965, 23,095
15 Claims. (Cl. 192—8)

This invention relates to a one-way locking or braking device.

One-way locking devices are frequently required in equipment such as for example, hoists, jacks or the like, where it is essential to prevent the return of the equipment to its original disposition as a result of the exertion of the return load on the equipment. Thus, when a hoist is used to raise a load and the actuating torque applied to the hoist in order to raise the load is moved, it is essential to ensure that the effect of the load on the hoist does not cause the return of the hoist to its original position.

Many one-way locking devices have been proposed, the best known device consisting of a self-locking worm and gear transmission. Thus with such a transmission the worm can be rotated in either sense and the gear will be displaced accordingly. Any attempt however to displace the gear will not result in a rotation of the worm. Such a worm and gear transmission tends to be rather complicated having as it does two gears each provided with a corresponding shaft and bearings. Furthermore the fact that the two shafts of the transmission can never be aligned is distinctly disadvantageous and limits the application of the transmission. Furthermore the theoretical efficiency of such a transmission is less than 50% and in practice seldom exceeds 30%.

Other known self-locking devices consist of springs and locking bars or springs and locking rollers with special means being provided for releasing the bars or rollers. Such devices tend to be quite cumberous and are particularly inefficient when both the driving and driven torques are applied in the same direction. Furthermore these devices tend to be located in the centre of the driving shaft and this location is often required for other components.

It is an object of the present invention to provide a new and improved one-way locking or braking device in which the above-referred to disadvantages are substantially reduced or avoided, and in which efficiencies above 50% can be obtained.

The device consists essentially of three main parts namely a fixed member, a movable driving member and a movable driven member. Two main variations of the device are conceived in both of which the coaxial driving and driven members are coupled together via a screw thread coupling which will be denoted hereafter, the second thread. In accordance with one variation, however, the driving body is coupled to the fixed member via a first screw thread coupling whilst in accordance with the second variation it is the driven member which is coupled to the fixed member via the first screw thread coupling. Thus it will be seen that whilst in accordance with the first variation the driving member can perform an axial motion with respect to the fixed member in accordance with the second variation it is the driven member which can perform this axial motion.

The present invention is based upon the determination of particular relationships which must exist between some of the dimensions of the device and other parameters thereof so as to allow the device to act either as a one-way locking device or as a braking device.

In accordance with the invention different sets of relationships are established respectively for the first and second variations referred to above. Furthermore, in the case of the one-way locking device different sets of relationships are established corresponding to what is hereinafter referred to as first, second and third order self-locking. In a first order self-locking device the driving member can never become the driven member and, where the driven member attempts to drive the driving member the device locks. In a second order self-locking device locking additionally occurs when, in the event that the driven member is subjected to an active torque the driving member tends to drive in the same direction. Such an eventuality, for example, occurs where the device is utilized in lifting an object, here the driven member or a component directly coupled thereto does the actual lifting and so the weight of the object to be lifted applies a return torque to the driving member. Where the device is merely a first order self-locking device then, as explained above, this return torque cannot under any circumstances result in the displacement of the driving member as the device becomes locked. If, however, the device is a second order self-locking device then the driving member cannot be displaced so as to lower the weight as that would involve a tendency to drive the driven member in the same direction as the return torque. It will be realised, of course, that in such a case second self-locking is a distinct disadvantage. It will equally well be realised that examples can be conceived and will be described below where such second order self-locking may be desirable or advantageous.

With third order self-locking, displacement of the displaceable components of the device only becomes possible when a turning torque is applied to both the driving and driven members simultaneously. Thus, if drive is only applied to the driving member locking occurs and similarly of course if the drive is only applied to the driven member locking also occurs. An example of the application of such a third order self-locking device is in the case of a machine, for example a punching machine where, for safety reasons it is required to ensure that the machine only operates when the operator manipulates it with both hands, i.e. when he rotates both the driving and driven members simultaneously and respectively with both his hands.

The particular relationships referred to above, the circumstances in which they are to be applied and devices constructed in accordance with these relationships will now be set out and described in detail with reference to the accompanying drawings in which:

FIG. 1 is a partially sectioned elevation of a first form of first variation one-way locking device in accordance with the invention.

FIG. 2 is a partially sectioned elevation of a second form of first variation one-way locking device in accordance with the invention.

FIGS. 3 and 4 are sectional views respectively along the lines III—III and IV—IV of the first variation device shown in FIG. 2; and FIGS. 5 and 6 are respectively partially sectioned elevations of two differing forms of one-way locking or braking devices of the second variation in accordance with the invention.

FIG. 7 is a partially sectioned elevation of a third form of first variation one-way locking device in accordance with the invention.

In the first variation of the device referred to above, in which both the first and second screw thread couplings should be equally handed the condition that the device fulfills first order reversible braking is given by the relationship $$\tan(B-A') \leqslant 2\frac{\mu_2+\mu_1\dfrac{R_a}{R_b}}{1-\mu_1\mu_2\dfrac{R_a}{R_b}} \quad (i)$$

whilst the condition for first order self-locking is $$\tan(B-A') \leqslant \frac{\mu_2+\mu_1\cdot\dfrac{R_a}{R_b}}{1-\mu_1\mu_2\dfrac{R_a}{R_b}} \quad (ii)$$

In these relationships: $A' = AR_a/R_b$ $A$ = lead angle of first screw thread coupling
$R_a$ = pitch radius of first screw thread coupling
$B$ = lead angle of second screw thread coupling
$R_b$ = pitch radius of second screw thread coupling
$\mu_1$ = virtual friction coefficient between first screw thread members
$\mu_2$ = virtual friction coefficient between second screw thread members It will be seen at once that the condition for first order self-locking in the first variation of the device is entirely independent of the nature of the bearings between the relatively moving parts which can either be the relatively frictionless ball or roller bearings or the frictional sliding bearings.

In the case of second order self-locking with the first variation the condition for such self-locking is given by $$\tan B \leqslant \frac{\mu_2 - \mu_f\dfrac{R_f}{R_b}}{1+\mu_2\mu_f\dfrac{R_f}{R_b}} \quad (iii)$$

where
$\mu_f$ = virtual coefficient of friction of the thrust bearings
$R_f$ = mean radius of the thrust bearings Thus for second order self-locking the condition, in the first variation, is entirely independent of the value of the lead angle of the first screw thread coupling. Furthermore, it is clear that for the case where ball or roller bearings are employed as thrust bearings and in consequence $\mu_f \to 0$ the above relationship becomes $$\tan B \leqslant \mu_2 \quad (iv)$$

In the case of third order self-locking with the first variation the condition is exposed by the relationship $$\tan B \leqslant \frac{\mu_f\dfrac{R_f}{R_b} - \mu_2}{1+\mu_2\mu_f\dfrac{R_f}{R_b}} \quad (v)$$

Here again the condition is independent of the magnitude of the lead angle of the first screw thread coupling but in this case, the condition can only be satisfied when frictional (e.g. sliding thrust) bearings are employed.

Now as seen in FIG. 1 of the drawings the one-way locking device comprises a sleeve 1 constituting a driving member. The two internal end portions 3 and 4 of the sleeve 1 are provided with screw threading having respective lead angles A and B. The left hand end 3 of the sleeve 1 is screwed onto an externally threaded central portion 5 of a shaft 6 which is fixedly mounted with respect to a support. A pair of deep groove, ball bearings 8 are respectively mounted on a tubular extension 9 of the shaft 6 and support a coaxial driven sleeve 10 which is externally screw threaded and upon which is screwed the righthand end 4 of the driving sleeve 1.

The central portion 5 of the fixed shaft 6 is provided with a screw threading having a leading angle A whilst the driven sleeve 10 is provided with a screw threading having a leading angle B.

If now we consider the relationship given above for ensuring that the device just described operates as a braking mechanism we note that in the present case $R_a$ equals $R_b$ and $\mu_1$ equals $\mu_2$. In consequence the relationship given above resolves down to the relationship $(B-A) \leqslant 4\varphi$ (bearing in mind that the coefficient of friction $\mu = \tan \varphi$ where $\varphi$ is the angle of friction).

Where it is desired that the device should be designed so as to operate entirely as a first order one-way locking mechanism the condition is that $(B-A) \leqslant 2\varphi$. Where however $(B-A)$ lies between $2\varphi$ and $4\varphi$ the device operates as a one-way braking mechanism.

While the invention shown in FIG. 1 may bear a superficial resemblance to well-known differential screw mechanisms, it is in reality basically quite different. In differential screw mechanisms, the driven member does not rotate, but moves in the axial direction, i.e., the device converts rotary to linear motion. In the invention shown in FIG. 1, on the other hand, the driven member 10 is constrained in the axial direction by the shoulders of bearing 8 and can thus only rotate, i.e., the device converts rotary to rotary motion. While the driver 1 does also experience a slight amount of axial motion in addition to its rotary motion, this axial motion represents a by-product rather than the principal function of the device.

Apart from the above, the main difference between conventional differential screws and the present invention lies in the fact that the latter is capable of much higher efficiencies. As is well known and proved in many text books, conventional screw devices which are self-locking are unable to attain an efficiency of over 50%. Practically speaking, their efficiency is often as low as 30% or even less, depending on the screw lead angle. By comparison, the present invention is able to attain efficiencies in the 70–90% range, provided the bearing 8 is a relatively frictionless ball or roller bearing rather than a sliding bearing. Under this condition, the efficiency $e$ of the device is given by the formula $$e = \frac{\left(1+\dfrac{\mu_2}{\tan B}\right)\left(1+\mu_1\cdot\dfrac{R_a}{R_b}\cdot\tan A'\right)}{1+\dfrac{\mu_2+\mu_1 R_a/R_b}{\tan(B-A')}-\mu_1\mu_2 R_a/R_b} \quad (a)$$

In a model of the invention actually constructed, the following values were used:

$B = 22°$
$A = 3\frac{1}{4}°$
$R_a/R_b = 0.765$

Assuming a virtual friction coefficient of $\mu_1 = \mu_2 = 0.20$, the calculated efficiency is 77%. Tests conducted on a number of models built have shown a close agreement between calculated and measured efficiency. It would obviously be impossible to attain an efficiency of 77% with conventional self-locking screw devices. The reason for this high efficiency is that the present invention uses rolling friction between the fixed and driven members, as compared to sliding friction between screw and nut in a conventional screw device.

In this connection, it is worth pointing out that the aim of the present invention is not to produce a very high speed-reduction ratio, as does a conventional screw device (and even more so differential screw devices). Rather, the present invention produces a speed ratio close to unity (the exact ratio depending on the lead angles of the threads), although ratios other than unity can also be obtained. Thus, one advantage of the present invention is that it can produce self-locking without a high speed-reduction ratio, and without appreciable loss in efficiency.

FIGS. 2, 3 and 4 illustrate a further embodiment of a one-way locking mechanism particularly adaptable for use as a car window raising or lowering mechanism. It will be appreciated that such a mechanism must be one-way locking so as to prevent unauthorised lowering of the window by the exertion of a downward pressure thereon. As seen in the drawings the device comprises an annular driving member 12 having an external screw threading 13 with a lead angle A and an internal screw threading 14 with a lead angle B. The annular driving member 12 is located within the threaded mouth of a cylindrical casing 15 which is fixedly secured at its end remote to the driving member 12 to a fixed member 16. The external screw threading 13 cooperates with an equivalent screw threading formed on the inner surface of the casing 15. The inner screw threading 14 co-operates with a correspondingly threaded end of a coaxial driven member 17 which extends into the casing 15 and is mounted with respect thereto by means of ball bearings 18. A pinion 19 is formed on the periphery of the driven member 17 and a rectilinear rack 20 (FIG. 4) engages the pinion 19 through a suitable slot 21 formed in the casing 15. The rack 20 is in its turn secured to the object, for example a car window or the like which is to be raised or lowered or alternatively a door which is to be displaced into and out of a sealing position.

The annular driving member 12 is formed integrally with a turning handle 22.

By ensuring that the radial dimensions of the driving and driven member, the coefficient of friction between these two members and the lead angles of the screw threading thereof are such that the relationship (ii) and the equation $$B \approx \frac{2\varphi^2}{B-A'} \quad \text{(b)}$$

are satisfied it can be ensured that no load exerted on the rack 20 will result in rotation of the driving member. In this way the device is perfectly self-locking and by virtue of the relationship (b) the effort involved in raising or lowering the window or the like will be the same.

In one practical example the coefficient of friction was 0.2 corresponding to an angle of friction of 11.3°. In consequence the lead angle B was taken to be 17° whilst the lead angle A was taken to be 2°. The handle was capable of four complete revolutions and with a pitch of $\frac{1}{15}''$ these four complete revolutions resulted in an axial motion of the handle of 0.27″.

A useful application of a second order self-locking device as described above is a door opening and closing device. With such a device it can be ensured that, a pressure chamber, as long as a superatmospheric pressure exists in the chamber, it is not possible to open the door.

Now, the condition for second order self-locking with substantially frictionless bearings is given by the relationship (iv) above. In practice this means that if the door of such a pressure chamber is secured to the gear rack of the device shown in FIG. 3 of the drawings, then opening of the door is effected by rotation of the handle which rotates the driving member and consequently rotates the driven member. It is assumed that the door opens towards the outside. If now a superatmospheric pressure exists in the chamber, then this superatmospheric pressure tries to open the door, so that a load is applied to the gear rack in the same direction as the load applied thereto by the driven member when it is desired to open the door. By designing the device so as to conform with relationship (iv) so that $$B \leqslant \varphi_2(\tan \varphi_2 = \mu_2)$$

it will be only possible to rotate the driven member by means of the handle so as to open the door when the torque exerted on the driven member is either zero or opposes the torque exerted on the handle, i.e., when a super-atmospheric pressure does not exist in the chamber. When a super-atmospheric pressure does exist the device is completely locked and it is impossible to open the door.

It has been indicated above that where the relationship between the lead angles and the angle(s) of friction is suitably chosen the device operates as a one-way braking device and not as a one-way locking device. Such a one-way braking device is particularly useful when applied to the steering mechanism of a motor vehicle where it is desirable that the torque applied to the driven parts of a motor vehicle via the steering wheel should still be slightly felt on the steering wheel. This can be ensured by making $(B-A')$ slightly larger than $\varphi 2$. The larger $(B-A')$ is made the greater is the torque transmitted from the driven part to the driving part.

In the second variation of the device referred to above, in which both the first and second screw thread couplings are oppositely handed the condition that the device fulfills first order reversible braking is given by the relationship $$\tan B \leqslant 2 \frac{\mu_2 + \mu_f \frac{R_f}{R_b}}{1 - \mu_2 \mu_f \frac{R_f}{R_b}} \quad \text{(vi)}$$

whilst the condition for first order self-locking is $$\tan B \leqslant \frac{\mu_2 + \mu_f \frac{R_f}{R_b}}{1 - \mu_2 \mu_f \frac{R_f}{R_b}} \quad \text{(vii)}$$

As can be seen, the condition for first order self-locking in the second variation is independent of the lead angle of the first screw thread coupling A but is dependent on the nature of the bearings between the relatively moving parts. In the event where these bearings are substantially frictionless ball or roller bearings $\mu_f \to o$ and the condition for first order self-locking becomes $$\tan B \leqslant \mu_2 \quad \text{(viii)}$$

In the case of second order self-locking with the second variation the condition is given by $$\tan (A'+B) \leqslant \frac{\mu_2 - \mu_1 \frac{R_a}{R_b}}{1 + \mu_1 \mu_2 \frac{R_a}{R_b}} \quad \text{(ix)}$$

Finally the condition for third order self-locking with the second variation is given by $$\tan (A'+B) \leqslant \frac{\mu_1 \frac{R_a}{R_b} - \mu_2}{1 + \mu_1 \mu_2 \cdot \frac{R_a}{R_b}} \quad \text{(x)}$$

If now consideration is given to FIGS. 5 and 6 of the drawings in which second variation devices are shown we see that the one-way locking device comprises a sleeve 31 constituting a driven member. The two internal end portions 32 and 33 of the sleeve 31 are provided with screw threading having respective lead angles B and A. The left-hand end 33 of the sleeve 31 is screwed onto an externally threaded central portion 34 of a shaft 35 which is fixedly mounted with respect to a support. A pair of deep-grooved ball bearings 37 are respectively mounted on a tubular extension of the shaft 35 and support a coaxial driving sleeve 39 which is externally screw-threaded and upon which is screwed the right-hand end 32 of the driven sleeve 31.

The central portion 34 of the fixed shaft 35 is provided with a screw threading having a lead angle A whilst the driving sleeve 39 is provided with a screw threading having a leading angle B.

If we now consider the relationship (viii) given above for ensuring that the device just described operates as a braking mechanism we note that in the present case B must be $\leqslant 2\varphi_2$ where $\varphi_2$ is the angle of friction and $\mu_2 = \tan \varphi_2$.

Where it is desired that the device should be designed so as to operate entirely as a one-way locking mechanism the condition is that $B \leq \varphi_2$. Where however B lies between $\varphi_2$ and $2\varphi_2$ the device operates as a one-way braking mechanism.

In the case of the second variation of the device, the efficiency $e$ is given by the following equation, provided ball or roller bearings are used between the fixed and driving members:

$$e = \frac{1+\mu_1\mu_2 R_a/R_b + \dfrac{\mu_2 - \mu_1 R_a/R_b}{\tan(B+A')}}{(1+\mu_1 R_a/R_b)(\mu_2/\tan B + 1)} \quad (c)$$

In a typical model of the invention, the following values could be used:

$B = 6°$
$A = 1\frac{1}{2}°$
$R_a/R_b = 0.3$

Again assuming a virtual friction coefficient $\mu_1 = \mu_2 = 0.20$ the calculated efficiency would be 73%, again a value unattainable with conventional self-locking screw devices.

It can be proved that the efficiency of the device (whether of the first or the second variation) is increased even further when it is driving a ball screw. This is because the ball screw, while contributing very little friction of its own, produces an axial thrust which cancels out some of the axial thrust produced in the threads of the device. It has been possible to obtain measured efficiencies of about 90% in self-locking models of the device connected to ball screws. Such combinations are illustrated in FIGURES 6 and 7.

FIG. 6 illustrates the application of a one-way locking device according to the second variation of the invention to a ball bearing screw. As seen in this drawing a ball bearing screw 41 is screwed into a ball nut 42 and by virtue of the rotation of the screw 41 a translational motion is imparted to the ball nut 42. The ball screw 41 has, formed as an axial extension thereof, a wide threaded portion 43 and a narrow threaded portion 44. The wide threaded portion 43 is screwed into an internally threaded fixed cylindrical sleeve 45 whilst the threaded portion 44 is screwed into the central threaded bore of an annular disc 46 which is supported on the flanged upper portion of the fixed sleeve 45 by means of a deep groove ball bearing 47. The disc 46 is in this case the driving member whilst the ball screw 41 is effectively the driven member. If the lead angle of the screw coupling 44 is B and the coefficient of friction between the screw coupling 44 and the disc 46 is $\mu_2$ then, as has been stated above, the condition for one-way locking is that $B \leq \varphi_2$ where $\tan \varphi_2 = \mu_2$.

It can be shown that, in order to attain a high efficiency with a ball screw fitted with a locking device in accordance with the second variation of the invention the assembly should be designed so that $$R_b = \frac{h}{2\pi \tan(B+\varphi_2)}$$

$R_b$ being the radius of the screw threaded portion 44 and $h$ being the pitch of the ball screw.

FIG. 7 shows an arrangement of a one-way locking device of the first variation using ball screws. Thus, as seen in FIG. 7 a hand driving wheel 51 is provided with an internal skirt 52 having an inner second screw thread 53 (pitch B) coupling with the external threading of a coaxial driven member 54 and an outer first screw thread 55 (pitch A) coupling with a fixed member 56. The driven member 54 is supported with respect to the fixed member 56 by means of a ball bearing 57 and carries a ball screw 58 provided with a ball nut 59. In this example the axial motion imparted to the ball nut can be used, e.g. to drive a machine tool table and the exact position of the table at any instant can be ascertained by determining the axial and angular position of the hand wheel with respect to a sealed fixed member.

Whilst the one-way locking and braking device described above is limited in its application in that it cannot be designed for an infinite number of revolutions of the driving member it will be realised that in this, the novel device is in practice not more restricted than known devices. On the other hand the novel device, as has been indicated above, is capable of ready and effective application to a great number of uses.

I claim:

1. A one-way locking device comprising a fixed member having a cylindrical section with a screw thread of lead angle A and pitch radius $R_a$; a rotating member rotatably mounted coaxially on said fixed member and having a cylindrical section with a second screw thread of lead angle B and pitch radius $R_b$; means for constraining said rotating member in the axial direction; and a second rotating member having two cylindrical sections, with the first cylindrical section containing a screw thread in threaded engagement with the screw thread of said fixed member, and the second cylindrical section containing a screw thread in threaded engagement with the screw thread of said first rotating member.

2. A one-way locking device according to claim 1, wherein said first rotating member is the driven member, said second rotating member is the driving member, and said two screw threads are equally handed.

3. A device according to claim 2, wherein $$\tan(B-A') \leq \frac{2(\mu_2 + \mu_1 R_a/R_b)}{1 - \mu_1\mu_2 R_a/R_b}$$

where $\mu_1$ is the virtual friction coefficient between second rotating and fixed members, $\mu_2$ is the virtual friction coefficient between second and first rotating members, and $A'$ equals $AR_a/R_b$.

4. A device according to claim 2, wherein $$\tan(B-A') \leq \frac{\mu_2 + \mu_1 R_a/R_b}{1 - \mu_1\mu_2 R_a/R_b}$$

said device having first-order self-locking.

5. A device according to claim 2, wherein $$\tan B \leq \frac{\mu_2 - \mu_f R_f/R_b}{1 + \mu_2\mu_f R_f/R_b}$$

where $\mu_f$ is the virtual friction coefficient between said first rotating member and said fixed member, and $R_f$ is the radius at which said friction coefficient is effective, said device having second-order self-locking.

6. A device according to claim 2, wherein $$\tan B \leq \frac{\mu_f R_f/R_b - \mu_2}{1 + \mu_2\mu_f R_f/R_b}$$

said device having third-order self-locking.

7. A device according to claim 1, wherein said second rotating member is constituted by a sleeve surrounding said fixed and first rotating members, with said first and second cylindrical sections containing said screw threads being formed respectively at opposite inner end positions of the sleeve.

8. A device according to claim 1, wherein said second rotating member is constituted by an annulus, with said first and second cylindrical sections containing screw threads being formed respectively on the inner and outer surfaces of said annulus.

9. A device according to claim 8, wherein said annulus is provided with a turning handle, and wherein said first rotating member is formed with a pinion adapted to engage a gear rack, so that upon rotation of said turning handle a translational motion is imparted to the gear rack.

10. A one-way locking device according to claim 1, wherein said first rotating member is the driving member, said second rotating member is the driven member, and said two screw threads are oppositely handed.

11. A device according to claim 10, wherein $$\tan B \leq \frac{2(\mu_2 + \mu_f R_f/R_b)}{1 - \mu_2 \mu_f R_f/R_b}$$

12. A device according to claim 10, wherein $$\tan B \leq \frac{\mu_2 + \mu_f R_f/R_b}{1 - \mu_2 \mu_f R_f/R_b}$$

said device having first-order self-locking.

13. A device according to claim 10, wherein $$\tan (A' + B) \leq \frac{\mu_2 - \mu_1 R_a/R_b}{1 + \mu_1 \mu_2 R_a/R_b}$$

said device having second-order self-locking.

14. A device according to claim 10, wherein $$\tan (A' + B) \leq \frac{\mu_1 R_a/R_b - \mu_2}{1 + \mu_1 \mu_2 R_a/R_b}$$

said device having third-order self-locking.

15. A device according to claim 1 in combination with a ball bearing screw, with the ball bearing screw adapted to be driven by the device.

References Cited

UNITED STATES PATENTS

| | | | |
|---|---|---|---|
| 786,310 | 4/1905 | Patterson | 254—102 |
| 873,248 | 12/1907 | Lagasse et al. | 254—102 |
| 2,334,635 | 11/1943 | Maher | 192—8 |
| 2,851,137 | 9/1958 | Gravenstine | 192—8 |
| 3,154,291 | 10/1964 | Salyer | 254—102 |

MARK NEWMAN, *Primary Examiner.*

ARTHUR A. McKEON, *Assistant Examiner.*